March 6, 1956

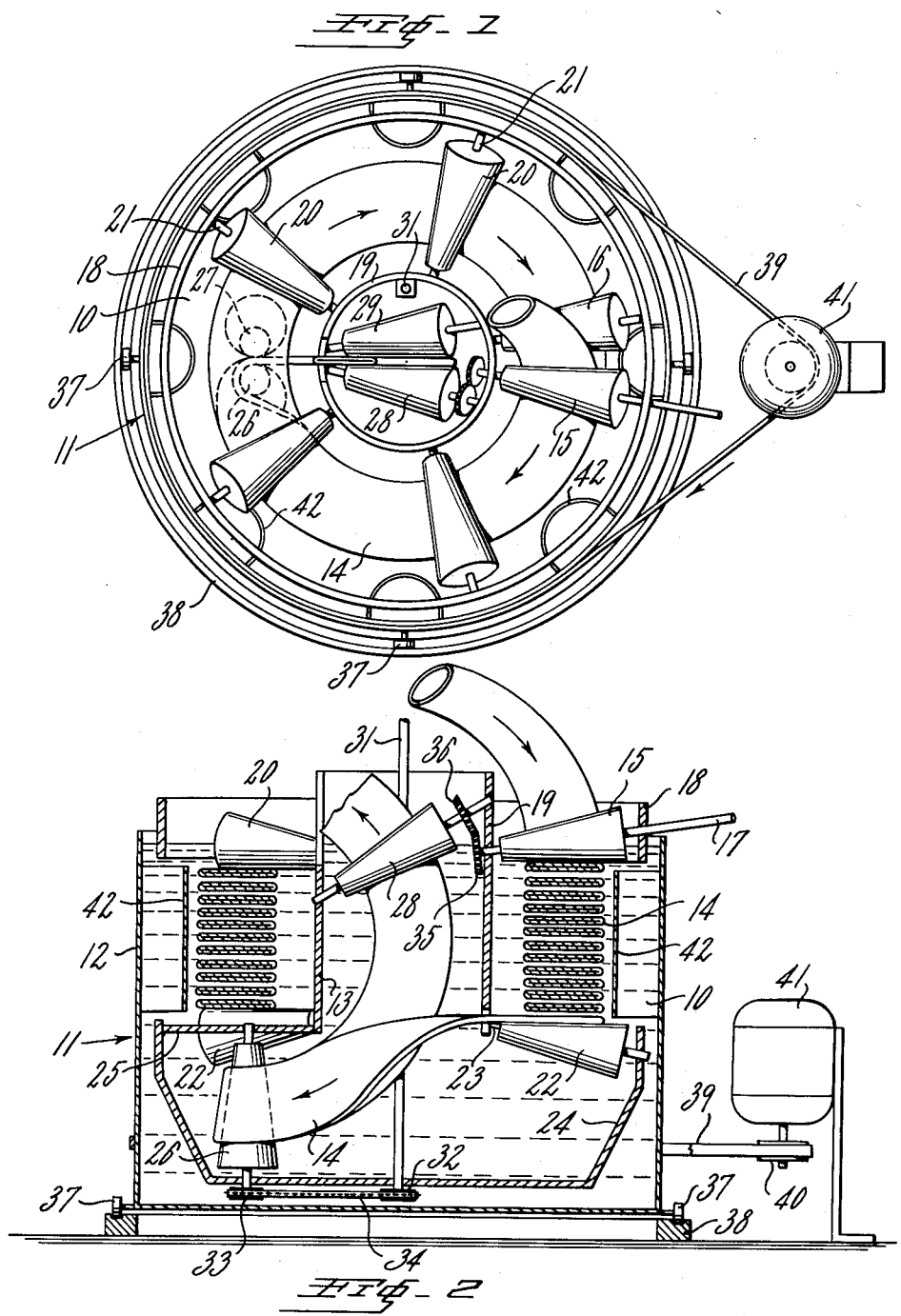

W. E. WOLSTENHOLME 2,737,023

METHOD OF AND APPARATUS FOR RAPIDLY
COOLING EXTRUDED STOCK

Filed April 6, 1953

INVENTOR.
WILLIAM E. WOLSTENHOLME

United States Patent Office 2,737,023
Patented Mar. 6, 1956

2,737,023

METHOD OF AND APPARATUS FOR RAPIDLY COOLING EXTRUDED STOCK

William E. Wolstenholme, East Orange, N. J., assignor to United States Rubber Company, New York, N. Y., a corporation of New Jersey Application April 6, 1953, Serial No. 347,132

7 Claims. (Cl. 62—1)

This invention relates to a method of and apparatus for rapidly cooling continuous lengths of a curved soft plastic material without subjecting the curved material to distorting strains during the cooling process, and it is especially useful in the manufacture of inner tubes for pneumatic tires.

Formerly, inner tubes were made by extruding continuous straight lengths of tube stock having the circular outline of an inner tube in cross-section. Appropriate lengths were cut from this tube stock, and the ends of these lengths were spliced together to form a completed inner tube annulus. Before the material in these annuli was vulcanized, it was necessary to inflate these annuli to the normal inflated shape of an inner tube. During this inflation, the walls of the annuli were distorted to give the annuli the toroidal inner tube shape. This distortion produced inner tubes having walls of non-uniform thickness, and in particular the distortion of the tubes caused the walls thereof to thin out in the tread region of the inner tubes. This in turn led to premature failure of the finished inner tubes in use.

The trend of recent tire design has been toward tires of smaller rim diameter and larger cross-sectional area, which require similarly shaped tubes. Were these tubes to be manufactured by the above described process, the variations in wall thickness, and particularly the thinning out of the wall of the tread portion, would be greatly aggravated. To overcome the disadvantages of tubes made by this method, efforts have been directed toward forming inner tubes by methods in which the tube stock is given an arcuate shape during or immediately after extrusion when it is in a soft plastic condition. In this manner, the walls of the curved tube stock can be formed having a substantially uniform thickness, and since the stock is already curved before lengths of it are severed and spliced to form annuli, these walls will not be distorted so greatly when the annuli are inflated.

However, since the extruded stock when produced in accordance with these newer methods no longer has a straight configuration but now has an arcuate configuration, the old and relatively simple methods of handling and cooling the soft plastic stock immediately after extrusion cannot be used, but new methods and apparatus adapted to handle the curved stock without distorting it are required. It is an object of this invention to provide an improved method and apparatus for rapidly cooling a continuous curved length of a soft plastic material, such as the rubber inner tube stock heretofore described, without subjecting the special curved shape to distorting strains during the cooling period.

In the apparatus and process of this invention, the curved stock is led from an extruder to a cooling bath which fills an annular area defined by two upstanding concentric cylindrical walls. The stock is fed continuously into this bath in a substantially flat condition and is led downwardly through the bath along a helical path about the inner upstanding wall. After traversing the peripheral distance required for adequate cooling, the stock is withdrawn from the helix and the cooling bath. For advancement of the stock through the cooling bath, rotation of the helix formed by the layers of stock must be maintained. To promote helix rotation, either of the upstanding walls defining the cooling area may be rotated, whereby the cooling liquid is given a rotary motion.

In apparatus embodying this invention, a tank is provided which is adapted to contain a cooling bath. There is suspended in this tank a substantially cylindrical member which cooperates with the walls of the tank to define an annular area between the member and the tank wall. This cylindrical member is mounted in the tank in a manner such that one of these elements may be rotated as described above. Preferably a plurality of rotatable conical rollers are disposed radially around the annular area at two levels in the cooling bath; one group of rollers is disposed at or near the upper level of the cooling liquid and the other group at a lower level in the cooling bath. Some of the rollers at each level may be driven to help advance the stock along its helix. The rollers at the upper level help maintain proper rotation of the helix and keep the tube stock immersed in the cooling liquid, and those at the lower level serve to support the tube stock above their level and maintain rotation of the helix; effectively, these sets of rollers define the upper and lower levels of the helical cooling path within the annular area.

Above this cooling area is positioned a pair of driven conical rollers. These rollers are adapted to receive the curved stock from the extruder, to flatten it and to introduce the flattened stock into the cooling bath in a position to be advanced along the helical path. Similarly, beneath the surface of the liquid and near the terminus of the helical path a second pair of driven conical rollers is positioned. This latter pair of rollers is adapted to receive the cooled stock from the helical path and to direct it for withdrawal from the cooling bath.

The stock is led from an extruder through the first pair of driven conical rollers, which introduce the stock into the cooling bath, and thence through the cooling bath in the annular cooling area, along a downward helical path around the inner cylinder. Near the terminus of this helix the stock is led through the second pair of driven conical rollers and then is removed from the cooling bath to be cut into inner tube lengths.

For a better understanding of the nature of this invention, reference should be had to the following description when read in conjunction with the accompanying drawings in which:

Fig. 1 is a top plan view of one form of apparatus according to this invention adapted to carry out the method thereof;

Fig. 2 is a substantially central sectional view of the apparatus of Fig. 1;

Figure 3:
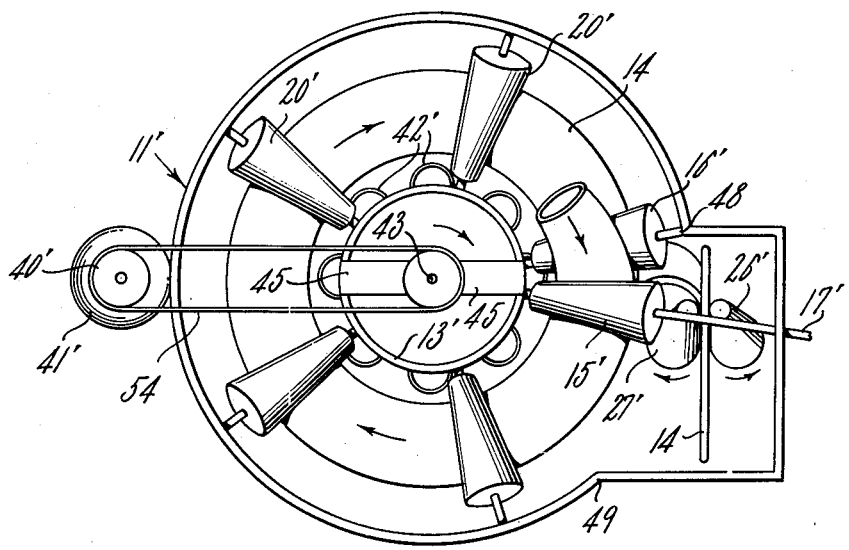
Fig. 3 is a plan view of a modified form of apparatus according to this invention adapted to carry out the method thereof.

There is shown in Figs. 1 and 2 a first form of apparatus embodying this invention in which the tubed extrudate is carried along the helical cooling path by rotation of the tank containing the cooling bath. In the apparatus shown in these figures, a cooling liquid 10 for the tubed extrudate is contained in a generally cylindrical tank 11. This tank 11 has an upstanding cylindrical wall 12 which forms one boundary of an annular cooling area for the inner tube stock. The other boundary of this annular cooling area is formed by an upstanding cylindrical member 13 which is non-rotatably positioned in the tank by supporting means (not shown) above the tank. Together the walls 12, 13 define an annular cooling area adapted to receive a curved tubed extrudate 14 to be cooled by the bath 10.

This curved stock 14 is formed by an extruding die (not shown) in a manner well known in the inner tube industry, and from the die it is led in the direction indicated by the upper arrow in Fig. 2 to a first pair of driven conical rollers 15, 16 positioned above the annular cooling area and adapted to introduce the curved stock into the cooling area in a flattened condition. In the embodiment shown in the drawings, the roller 15 is fixed to a driven shaft 17 which is journalled in the supporting frames 18, 19 for the cylindrical member 13; shaft 17 is rotated by any suitable power source (not shown). The supporting frame 19 may be conveniently an extension of the cylindrical member 13. The rollers 15 and 16 flatten the stock 14, and introduce it downwardly into the annular cooling area.

The stock is disposed in this cooling area in the form of a helix which encircles the cylindrical member 13 and extends downwardly from the rollers 15, 16 through the cooling bath. This helix is confined laterally in the cooling bath by the cylindrical walls 12, 13, and preferably, means are provided to confine the tube helix vertically in the bath. In the embodiment shown in the drawings this means takes the form of two groups of free running conical rollers. An upper group of these rollers 20 are positioned radially about the annular cooling area in a horizontal plane near the upper surface of the cooling liquid 10. These rollers 20 are fixed to shafts 21 which are journalled in the supporting frames 18, 19. The lower group of conical rollers 22 are similarly disposed at the lower level of the tube helix and are fixed to shafts 23 which extend radially from the cylindrical member 13. These shafts 23 are journalled in the member 13 and a support 24 suspended from the lower end of member 13 by means of a spider 25.

To withdraw the cooled stock from the apparatus an additional pair of driven conical rollers 26, 27 are provided near the terminus of the helical path. The stock upon leaving the helical path is led through the rollers 26, 27 and thence upwardly through the center of cylindrical member 13 to another pair of driven conical rollers 28, 29, which are rotatably suspended inside cylindrical member 13 by means of shafts journalled in member 13 near the surface of the cooling liquid, and which guide the tube stock from the apparatus. The lower driven conical rollers 26, 27 are fixed to shafts journalled in the support 24 and spider 25.

The roller 26 is driven from a shaft 31 which extends vertically through the cylindrical member 13 and support 24 and carries a sprocket 32 at its lower end. This sprocket is connected by the chain 34 to a similar sprocket 33 fixed to the shaft of roller 26 to rotatably drive this roller as the shaft 31 is rotated. The guiding roller 28 may be driven from the shaft 17 by means of intermeshing gears 35, 36 fixed to the inner end of shaft 17 and to the shaft for roller 28 respectively.

In cooling the tube stock 14, it is introduced by rollers 15, 16 into the bath 10 and is disposed in a downwardly extending helix therethrough; the stock is led through the bath continuously along its helical path to be thoroughly cooled, after which it passes through the rollers 26, 27 and rollers 28, 29 to be drawn from the apparatus. To transport the stock along its helical path, the liquid 10 is given a rotary movement. Simultaneously one of the walls forming the annular cooling area is rotated, so that if the stock is displaced laterally in the cooling bath, it will be subjected to a frictional drag by the rotating wall to urge it along the helical path.

In the embodiment of the invention shown in Figs. 1 and 2, means are provided for rotating the outer cylindrical wall 12. This is achieved by mounting the tank 11 on a plurality of rollers 37 which run in a track 38. The tank 11, and consequently the cylindrical wall 12, is rotated by means of a belt 39 which extends about a substantial portion of the circumference of the tank 11 in frictional contact therewith and thence to a pulley 40 fixed to the shaft of a motor 41. As the motor 41 is rotated, the belt 39 will rotate the tank 11 on the track 38 to rotate the wall 12 and to give the liquid in the bath a rotary movement.

The rotating wall should be disposed but a short distance from the tube helix, so that the tube may be displaced only a little distance laterally before it is subjected to the drag by this wall. If desired, the tank 11 may be constructed so the wall 12 is itself disposed but a short distance from the tube helix in the cooling bath. However, it has been found convenient to space the wall 12 a greater distance from the helix and to provide a plurality of shaped filler strips 42 about the periphery of this wall which are fixed thereto and which project into the cooling bath opposite the cylinder 13 and in close proximity to the tube helix. As the tank 11 is rotated, the strips 42 will be rotated, and should the tube helix be displaced laterally in the cooling bath it will be contacted by the shaped filler strips 42 at a great many points and hence be subjected to a frictional drag at these points to propel the tube stock along the helical path without subjecting it to substantial distorting strains. These filler strips 42 extend vertically only throughout the depth of the tube helix.

Figure 4:
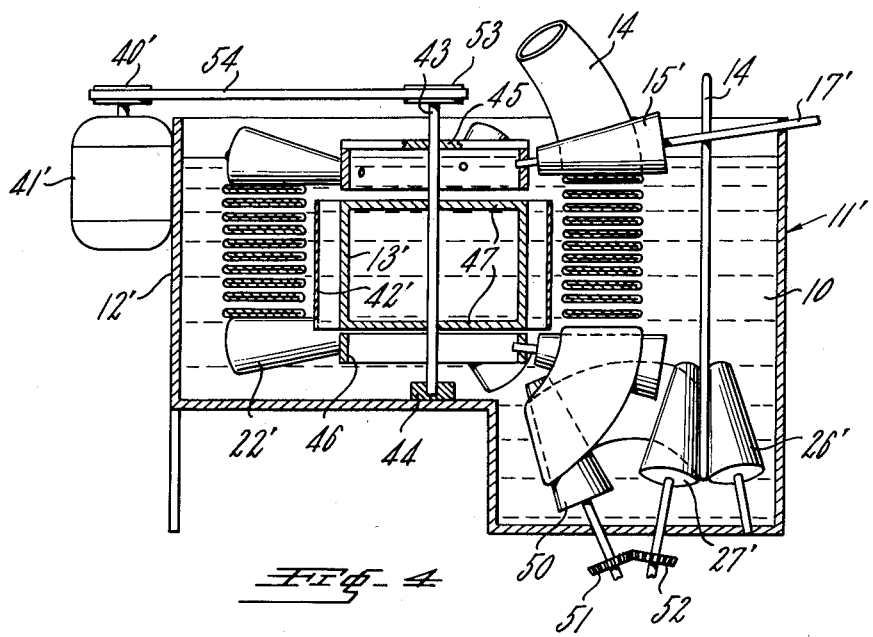
Fig. 4 is substantially a central sectional view of the apparatus shown in Fig. 3.

A modified form of the invention in which the tank is maintained stationary and the inner cylindrical member is rotated is shown in Figs. 3 and 4. In this embodiment, a tank 11' having a substantially cylindrical upstanding wall 12' is adapted to receive the cooling bath 10. Within this tank 11' there is secured an upstanding shaft 43 rotatably journalled in a bearing 44 fixed to the bottom of the tank 11' near its center. The shaft 43 is also journalled in fixed supports 45 and 46 which are positioned centrally in the tank 11' near the upper and lower levels respectively of the tube helix. A cylindrical member 13' is fixed to this shaft 43 by means of an upper and lower plate 47. This cylinder 13' and the wall 12' define an annular cooling area between them.

A pair of driven conical rollers 15' and 16', the former of which is fixed to a driven shaft 17', are positioned above this cooling area to introduce the tube stock into the bath. Near the terminus of the tube helix a second pair of driven conical rollers 26' and 27' are provided to exit the cooled stock from the bath. These rollers may conveniently be positioned near the bottom of an enlarged portion of the tank 11' so the tube stock 14 may be exited upwardly through the bath 10 outside the tube helix. In the embodiment shown in these figures of the drawing, this enlargement necessitates a departure from cylindricality through a part of the tank 11'. However, if a precisely annular cooling area is desired, a continuation of the cylindrical wall 12' in the form of a band may be disposed between points 48 and 49 opposite the tube helix. If desired, an auxiliary roller 50 may be provided near the terminus of the helix to guide the tube stock from the helix to the upstanding rollers 26' and 27'. The shafts to which rollers 27' and 50 are fixed are geared together by gears 51 and 52 fixed thereto, so that rollers 50 and 27' may be rotated by driving either of these shafts from a suitable power source (not shown).

As in the embodiment of the invention shown in Figs. 1 and 2, the embodiment shown in Figs. 3 and 4 is provided with a group of radially positioned free-running rollers 20' near the upper level of the annular cooling area and a group of similar rollers 22' near its lower level to position the tube helix vertically in the bath. These rollers are fixed to shafts journalled between the tank 11' and the supports 45 and 46 respectively.

The shaft 43, hence the cylinder 13', is driven from a motor 41' fixed to the outside of tank 11'. A pulley 40' on the shaft of motor 41' drives a similar pulley 53 on shaft 43 by means of a belt 54. As in the former embodiment, it is preferred to fix a plurality of filler strips 42' to the rotating member 13' to drag the tube along its helical path when the tube is displaced laterally in the annular cooling area.

The operation of the embodiment of the invention shown in Figs. 3 and 4 is similar to that of the embodiment shown in Figs. 1 and 2. The tube stock is disposed along a helix through the annular cooling area as defined by the upstanding walls 12' and 13'. As the member 13' is rotated, the liquid in the cooling bath is given a rotary movement to transport the tube stock along the helical path through the cooling liquid. Whenever the tube stock is displaced laterally in the cooling area it will contact the filler strips 42' to be subjected to a frictional drag at many points along the helical path to help transport the tube stock without subjecting it to substantial distorting strains. The chief difference between the operation of the two embodiments of the invention shown in the drawings, resides in the fact that in the embodiment shown in Figs. 1 and 2 the tube stock will be subjected to a frictional drag by the rotating wall whenever it is displaced outwardly from the center of the tube helix while in the embodiment shown in Figs. 3 and 4 the tube stock will be subjected to this frictional drag when it is displaced inwardly toward the center of the tube helix.

Although two specific embodiments of apparatus according to this invention have been illustrated in the drawings, it will be apparent that changes and alterations in these embodiments may be made without departing from the spirit or scope of this invention. Thus for example, instead of the free-running conical rollers 20, 22 and 20', 22' shown in the drawings to help position the helix vertically, the specific gravity of the cooling liquid 10 may be varied to control the position of the helix, or a combination of these means may be employed to achieve this result. Further, although in the embodiment shown in the drawings, the rotation of the rotatable wall which defines the annular cooling area is depended upon, in conjunction with the shaped filler strips 42 and 42', to impart a rotary movement to the tube stock in the helix, other means may be provided for giving the stock a rotary movement. Thus for example, a series of tangential jets may be positioned about the cooling area in the walls 12, 13 and 12', 13' in a position to impart rotary movement to the liquid in the cooling area by suitably re-circulating the cooling liquid or by introducing new liquid into the bath. Or a combination of tangential jets and the rotating wall may be relied upon to give the tube stock a rotary movement along the helical path.

Having thus described my invention, what I claim and desire to protect by Letters Patent is:

1. The method of cooling a continuous arcuate length of soft plastic material without subjecting the curved material to distorting strains, which comprises introducing the material into an annular area containing a cooling liquid, disposing a portion of the stock along a helical path through the cooling liquid beneath the surface of the liquid, imparting rotational forces to the portion of the stock in the cooling liquid at a multiplicity of points along the helical path to conduct the stock continuously along this path through the liquid, and conducting the cooled stock continuously from the liquid.

2. The method of cooling a continuous arcuate length of inner tube stock without subjecting the curved stock to distorting strains, which comprises introducing the stock into an annular area defined by two upstanding walls containing a cooling liquid, disposing a portion of the stock in the cooling liquid along a helical path through the annular area and in a position to be contacted by one of the walls, rotating the latter wall to impart rotational forces to the portion of the stock in the cooling liquid at a multiplicity of points along the helical path to conduct the stock continuously along this path through the liquid and conducting the cooled stock continuously from the liquid.

3. In the forming of inner tubes the process of rapidly cooling a continuous arcuate length of tube stock without subjecting it to distorting strains which comprises, introducing said stock in a flattened condition into a cooling bath confined in an annular area defined by a pair of upstanding walls, disposing said stock in the form of a helix through the cooling bath in the annular area, rotating the inner wall of the annular area to impart rotational forces to the stock disposed along the helical path at the points where it contacts the inner wall to thereby lead the stock continuously helically downwardly through the cooling bath, and continuously removing the cooled stock from the bath.

4. Apparatus for cooling a continuous arcuate length of soft plastic material without subjecting the curved material to distorting strains, which comprises substantially cylindrical upstanding walls defining an annular cooling area through which the material may be led along a helical path, a cooling liquid in said area, means for introducing the curved material into said cooling liquid, means for rotating one of said upstanding walls to impart a circular movement to the cooling liquid and a helical movement to said material, and means for conducting the cooled material from the liquid.

5. Apparatus for cooling continuous arcuate lengths of inner tube stock comprising a tank having an upstanding wall, a cylindrical wall disposed in said tank and co-operating with the upstanding wall to define an annular cooling area, a cooling liquid in said area, means for continuously introducing the stock into said liquid in a flattened condition so that it forms a helix in the cooling area, means for translating the stock including means for imparting a rotary motion to the liquid substantially about the axis of the helically disposed tube to thereby translate the curved stock through the liquid along a helical path, and means for conducting the cooled stock continuously from the liquid.

6. Apparatus for cooling continuous arcuate lengths of inner tube stock without subjecting it to distorting strains, comprising a cooling tank having an upstanding wall, a cylindrical member forming a second wall disposed in said tank opposite said upstanding wall whereby an annular cooling area is defined between said wall, a cooling bath in said tank filling said cooling area, a pair of conical rollers above said annular area for introducing the stock continuously into the cooling area to form a helix through the cooling area, means for rotating one of said walls to thereby impart a rotary movement to the stock, and conical rollers beneath said cooling area for conducting the cooled stock from the cooling bath.

7. Apparatus for cooling continuous curved lengths of inner tube stock without subjecting the stock to distorting strains which comprises a substantially cylindrical tank having upstanding walls, a cylindrical member disposed in said tank opposite said upstanding wall whereby an annular cooling area is defined between said wall and said member, a cooling bath in said area, means for continuously introducing the stock into said bath so that it forms a helix through the cooling area, a plurality of projections extending from said cylindrical member into said cooling area in close proximity to said helix, means for rotating said cylindrical member whereby when the stock contacts said projecting means it will be translated along a helical path through the cooling bath, and means for conducting the cooled stock from the bath.

References Cited in the file of this patent

UNITED STATES PATENTS

| | | |
|---|---|---|
| 2,037,421 | Littler | Apr. 14, 1936 |
| 2,125,001 | Cowen et al. | July 26, 1938 |
| 2,501,584 | Schanz | Mar. 21, 1950 |
| 2,613,392 | Ternes | Oct. 14, 1952 |